United States Patent
Jung et al.

(10) Patent No.: US 7,407,553 B2
(45) Date of Patent: Aug. 5, 2008

(54) DISPENSER FOR FABRICATING A LIQUID CRYSTAL DISPLAY PANEL

(75) Inventors: Sung-Su Jung, Daegu (KR); Yong-Keun Kwak, Gangwon-Do (KR)

(73) Assignee: LG Display Co., Ltd., Seoul (KR)

( * ) Notice: Subject to any disclaimer, the term of this patent is extended or adjusted under 35 U.S.C. 154(b) by 392 days.

(21) Appl. No.: 10/825,206

(22) Filed: Apr. 16, 2004

(65) Prior Publication Data

US 2004/0241318 A1    Dec. 2, 2004

(30) Foreign Application Priority Data

Jun. 2, 2003    (KR) .................. 10-2003-0035416

(51) Int. Cl.
- *B05B 7/06* (2006.01)
- *B05B 13/02* (2006.01)
- *B01L 3/02* (2006.01)

(52) U.S. Cl. .................. 118/313; 118/305; 422/100; 141/100

(58) Field of Classification Search .......... 118/313, 118/305, 300; 349/189; 222/132, 135, 136, 222/326, 386, 386.5, 504, 137; 141/100, 141/9, 67; 422/100–104

See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,344,768 A | * 8/1982 | Parker et al. | 436/43 |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |

(Continued)

FOREIGN PATENT DOCUMENTS

EP    1 003 066    5/2000

(Continued)

OTHER PUBLICATIONS

English Translat. detailed Description of JP-2002-258299.*

*Primary Examiner*—Yewebdar T Tadesse
(74) *Attorney, Agent, or Firm*—McKenna Long & Aldridge LLP (57) ABSTRACT

A dispenser is provided for fabricating a liquid crystal display panel. The dispenser includes at least one dispensing unit to supply a dispensing material on a substrate, at least one support member to support and align the dispensing unit, and a plurality of syringes mounted on each dispensing unit.

14 Claims, 5 Drawing Sheets

U.S. PATENT DOCUMENTS

| | | | |
|---|---|---|---|
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,387,330 B1* | 5/2002 | Bova et al. | 422/100 |
| 6,414,733 B1 | 7/2002 | Ishikawa et al. | |
| 6,540,104 B1* | 4/2003 | Yanagita et al. | 222/1 |
| 6,583,848 B2* | 6/2003 | Hashimoto et al. | 349/187 |
| 7,055,723 B2* | 6/2006 | Ingenhoven et al. | 222/504 |
| 2001/0021000 A1 | 9/2001 | Egami | |
| 2004/0020942 A1* | 2/2004 | Ingenhoven et al. | 222/135 |
| 2004/0050866 A1* | 3/2004 | Ingenhoven et al. | 222/135 |
| 2004/0134619 A1* | 7/2004 | Kojima | 156/356 |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | H06-018829 | 1/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 8-101395 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 9-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-281511 | 10/1997 |
| JP | 09-311340 | 12/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |

| | | | | | |
|---|---|---|---|---|---|
| JP | 2001-133799 | 5/2001 | JP | 2002-122873 | 4/2002 |
| JP | 2001-142074 | 5/2001 | JP | 2002-131762 | 5/2002 |
| JP | 2001-147437 | 5/2001 | JP | 2002-139734 | 5/2002 |
| JP | 2001-154211 | 6/2001 | JP | 2002-156518 | 5/2002 |
| JP | 2001-166272 | 6/2001 | JP | 2002-169166 | 6/2002 |
| JP | 2001-166310 | 6/2001 | JP | 2002-169167 | 6/2002 |
| JP | 2001-183683 | 7/2001 | JP | 2002-182222 | 6/2002 |
| JP | 2001-201750 | 7/2001 | JP | 2002-202512 | 7/2002 |
| JP | 2001-209052 | 8/2001 | JP | 2002-202514 | 7/2002 |
| JP | 2001-209056 | 8/2001 | JP | 2002-214626 | 7/2002 |
| JP | 2001-209057 | 8/2001 | JP | 2002-229042 | 8/2002 |
| JP | 2001-209058 | 8/2001 | JP | 2002-236276 | 8/2002 |
| JP | 2001-209060 | 8/2001 | JP | 2002-236292 | 9/2002 |
| JP | 2001-215459 | 8/2001 | JP | 2002-258299 | 9/2002 |
| JP | 2001-222017 | 8/2001 | JP | 2002-277865 | 9/2002 |
| JP | 2001-235758 | 8/2001 | JP | 2002-277866 | 9/2002 |
| JP | 2001-255542 | 9/2001 | JP | 2002-277881 | 9/2002 |
| JP | 2001-264782 | 9/2001 | JP | 2002-287156 | 10/2002 |
| JP | 2001-272640 | 10/2001 | JP | 2002-296605 | 10/2002 |
| JP | 2001-281675 | 10/2001 | JP | 2002-311438 | 10/2002 |
| JP | 2001-281678 | 10/2001 | JP | 2002-311440 | 10/2002 |
| JP | 2001-282126 | 10/2001 | JP | 2002-311442 | 10/2002 |
| JP | 2001-305563 | 10/2001 | JP | 2002-323687 | 11/2002 |
| JP | 2001-330837 | 11/2001 | JP | 2002-323694 | 11/2002 |
| JP | 2001-330840 | 11/2001 | JP | 2002-333628 | 11/2002 |
| JP | 2001-356353 | 12/2001 | JP | 2002-333635 | 11/2002 |
| JP | 2001-356354 | 12/2001 | JP | 2002-333843 | 11/2002 |
| JP | 2002-14360 | 1/2002 | JP | 2002-341329 | 11/2002 |
| JP | 2002-23176 | 1/2002 | JP | 2002-341355 | 11/2002 |
| JP | 2002-040398 | 2/2002 | JP | 2002-341356 | 11/2002 |
| JP | 2002-49045 | 2/2002 | JP | 2002-341357 | 11/2002 |
| JP | 2002-079160 | 3/2002 | JP | 2002-341358 | 11/2002 |
| JP | 2002-82340 | 3/2002 | JP | 2002-341359 | 11/2002 |
| JP | 2002-90759 | 3/2002 | JP | 2002-341362 | 11/2002 |
| JP | 2002-90760 | 3/2002 | KR | 2000-0035302 | 6/2000 |
| JP | 2002-107740 | 4/2002 | WO | WO 02/40165 | * 5/2002 |
| JP | 2002-122870 | 4/2002 | | | |
| JP | 2002-122872 | 4/2002 | * cited by examiner | | |

DISPENSER FOR FABRICATING A LIQUID CRYSTAL DISPLAY PANEL

The present application claims the benefit of Korean Patent Application No. 35416/2003 filed in Korea on Jun. 2, 2003, which is hereby incorporated by reference.

BACKGROUND OF THE INVENTION

1. Field of the Invention

The present invention relates to the fabrication of a liquid crystal display panel and, more particularly, to a dispenser for fabricating a liquid crystal display panel.

2. Description of the Related Art

In a liquid crystal display device, data signals corresponding to picture information are individually supplied to liquid crystal cells arranged in a matrix. The light transmittance of each liquid crystal cell is controlled to display a desired picture. The liquid crystal display device includes a liquid crystal display panel having the liquid crystal display cells and a driver integrated circuit (IC) for driving the liquid crystal cells. The liquid crystal display panel also has a color filter substrate and a thin film transistor array substrate facing each other with a liquid crystal layer positioned between the color filter substrate and the thin film transistor array substrate.

Data lines and gate lines are formed on the thin film transistor array substrate of the liquid crystal display panel. The data lines and the gate lines cross at right angles, thereby defining the liquid crystal cells adjacent to each of the crossings. The data lines transmit a data signal supplied from the data driver integrated circuit to the liquid crystal cells. The gate lines transmit a scan signal supplied from the gate driver integrated circuit to the liquid crystal cells. The gate driver integrated circuit sequentially supplies scan signals to the gate lines so that the liquid crystal cells arranged in the matrix can be sequentially selected line by line. A data signal is supplied to the selected one of the data lines of liquid crystal cells from the data driver integrated circuit.

A common electrode and a pixel electrode system are respectively formed on the inner side of the color filter substrate and the inner side of the thin film transistor array substrate. An electric field is applied across the liquid crystal layer using the common electrode and the pixel electrode. More specifically, the pixel electrode is formed in each liquid crystal cell on the thin film transistor array substrate. The common electrode is integrally formed over the entire surface of the color filter substrate. Therefore, by controlling a voltage applied to the pixel electrode when a voltage is applied to the common electrode, light transmittance of the individual liquid crystal cells can be controlled. To control the voltage applied to the pixel electrode of liquid crystal cells, thin film transistors used as switching devices are formed so that each correspond to a liquid crystal cell.

Figure 1:
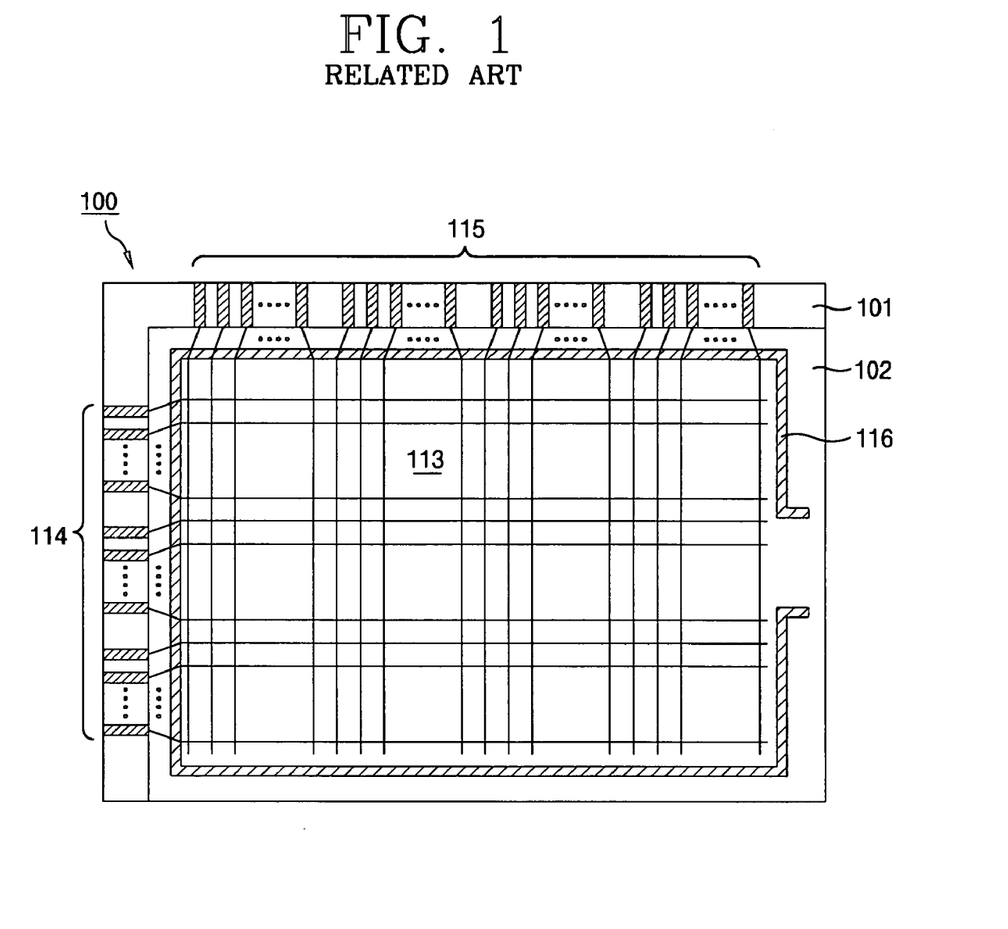
FIG. 1 is a plan view of the unit liquid crystal display panel formed having a thin film transistor array substrate and a color filter substrate according to the related art.

Elements of a related art liquid crystal display device will now be described. FIG. 1 is a plan view of the unit liquid crystal display panel having a thin film transistor array substrate and a color filter substrate according to the related art.

As shown in FIG. 1, the liquid crystal display panel 100 includes an image display portion 113 where the liquid crystal cells are arranged in a matrix, a gate pad portion 114 connected to the gate lines of the image display portion 113, and a data pad portion 115 connected to the data lines. The gate pad portion 114 and the data pad portion 115 are formed along an edge region of the thin film transistor array substrate 101 that does not overlap the color filter substrate 102. The gate pad portion 114 supplies a scan signal from the gate driver integrated circuit to the gate lines of the image display portion 113, and the data pad portion 115 supplies image information from the data driver integrated circuit to the data lines of the image display portion 113.

Data lines to which image information is applied and gate lines to which a scan signal is applied are provided on the thin film transistor array substrate 101. The data lines and the gate lines cross each other. Additionally, a thin film transistor for switching the liquid crystal cells is provided at each crossing of the data lines and the gate lines. Pixel electrodes for driving the liquid crystal cells connected to the thin film transistors are provided on the thin film transistor array substrate 101. A passivation film protecting the thin film transistors is formed on the entire surface of the thin film transistor array substrate 101.

Color filters in the cell regions of the color filter substrate 102 are separated by the black matrix. A common transparent electrode is provided on the color filter substrate 102. The thin film transistor array substrate 101 and the color filter substrate 102 are attached to each other by a seal pattern 116 formed along an outer edge of the image display portion 113. Here, a cell gap is maintained uniformly by a spacer between the thin film transistor array substrate 101 and the color filter substrate 102.

In fabricating the liquid crystal display panel, a method for simultaneously forming a multiple liquid crystal display panels on a large-scale mother substrate is typically used. Thus, this method requires a process for separating the liquid crystal display panels from the large-scale mother substrate by cutting and processing the mother substrate having the plurality of liquid crystal display panels formed thereon. After a liquid crystal display panel is separated from the large-scale mother substrate, liquid crystal is injected through a liquid crystal injection opening to form a liquid crystal layer in the cell gap which separates the thin film transistor array substrate 101 and the color filter substrate 102. Then, the liquid crystal injection opening is sealed.

To fabricate a liquid crystal display panel, the following processes are generally required. First, the thin film transistor array substrate 101 and the color filter substrate 102 are separately fabricated on the first and second mother substrates. The first and second mother substrates are attached so that a uniform cell gap is maintained therebetween. The attached first and second mother substrates are cut into unit panels. Then, liquid crystal is injected to the cell gap between the thin film transistor array substrate 101 and the color filter substrate 102.

Figure 2A:
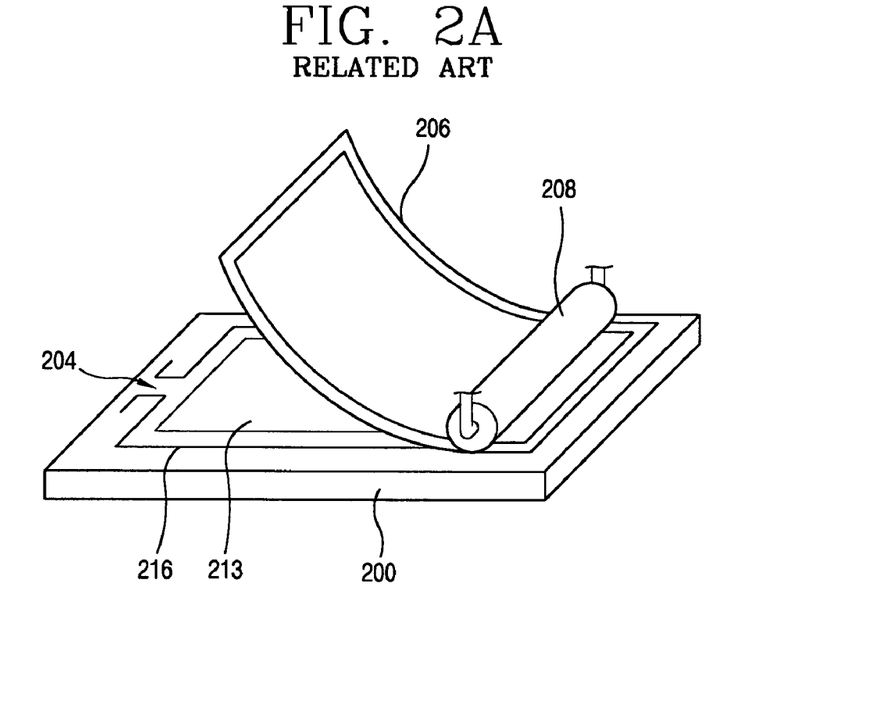
FIGS. 2A and 2B illustrate formation of a seal pattern through a screen printing method in accordance with the related art.
Figure 2B:
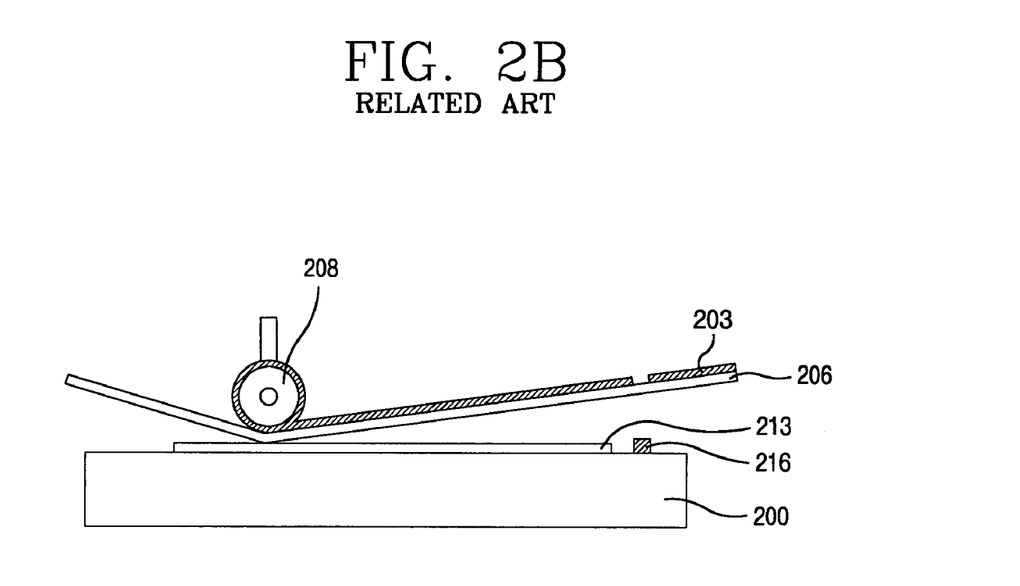

A process of forming the seal pattern 116 along an outer edge of the image display portion 113 is required to attach the thin film transistor array substrate 101 and the color filter substrate 102. The related art seal pattern forming method will now be described. FIGS. 2A and 2B illustrate a screen printing method to form a seal pattern.

As shown in FIGS. 2A and 2B, a screen mask 206 is provided with a pattern so that a seal pattern forming region is selectively exposed. A rubber squeegee 208 for selectively supplying a sealant 203 to the substrate 200 through the screen mask 206 is used to form the seal pattern 216. Thus, the seal pattern 216 is formed along an outer edge of the image display portion 213 of the substrate 200, and a liquid crystal injection opening 204 is formed at one side. The opening 204 is for injecting liquid crystal into the cell gap between the thin film transistor array substrate 101 and the color filter substrate 102. The seal pattern 216 prevents the leakage of the liquid crystal.

In general, the screen printing method includes applying the sealant 203 on the screen mask 206 having a seal pattern forming region patterned thereon, forming the seal pattern 216 on the substrate 200 through printing with the rubber squeegee 208, drying the seal pattern 216 by evaporating a solvent contained in the seal pattern 216, and leveling the seal pattern 216. The screen printing method is widely used because it has the advantage of processing ease. However, it has the disadvantage of wasting sealant. More particularly, sealant is wasted because sealant is applied over the entire surface of the screen mask 206 and then the seal pattern is printed with the rubber squeegee 208. As a result, excess sealant material, which is not printed, is discarded. In the case of fabricating a large-scale liquid crystal display panel, more sealant is consumed, thereby increasing a unit cost of the liquid crystal display device. In addition, the screen printing method has another disadvantage in that a rubbed alignment layer (not shown) formed on the substrate 200 is degraded as a result of the screen mask 206 being brought into contact with the substrate 200. The degradation of the rubbed alignment layer degrades picture quality of the liquid crystal display device.

Figure 3:
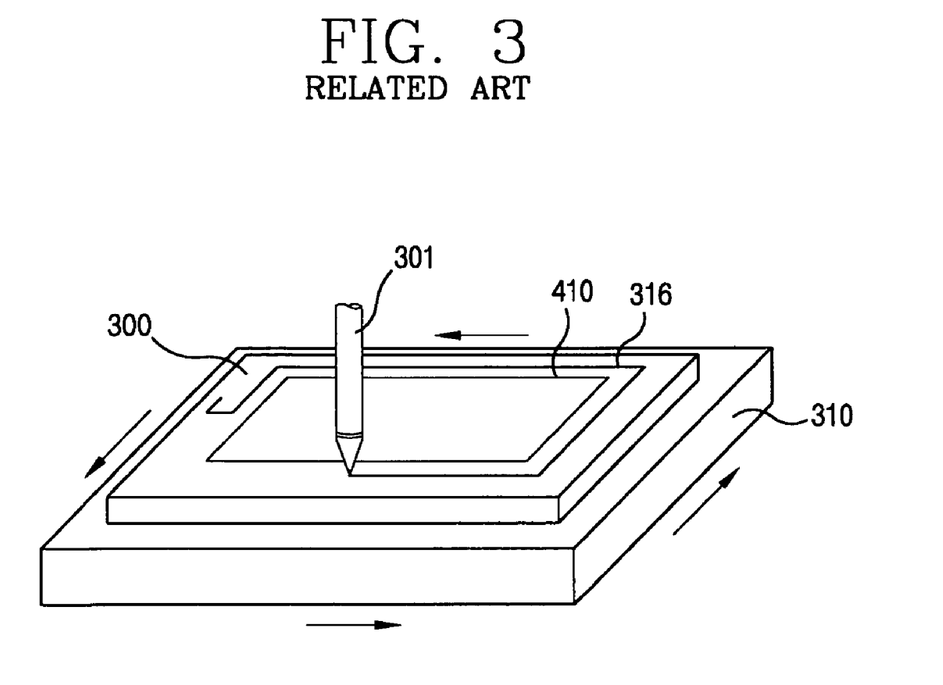
FIG. 3 illustrates formation of a seal pattern through a seal dispensing method in accordance with the related art.

Therefore, to overcome the shortcomings of the screen printing method, a seal dispensing method has been proposed. FIG. 3 is an exemplary view of a dispensing method for forming a seal pattern in accordance with the related art.

As shown in FIG. 3, while a table 310 with a substrate 300 loaded thereon is moved in forward/backward and left/right directions, a seal pattern 316 is formed along an outer edge of an image display portion 410 of the substrate 300 by applying a certain pressure to sealant in a syringe 301. In this seal dispensing method, since the sealant is selectively supplied to the region where the seal pattern 316 is to be formed, sealant consumption can be reduced. In addition, since the syringe is not in contact with the alignment layer (not shown) of the image display portion 410 of the substrate 300, the rubbed alignment layer is not damaged, and thus, the picture quality of the liquid crystal display device is not degraded.

When forming the seal pattern 316 on the substrate 300 loaded on the table 310 using the syringe 301, a technique is required to precisely control a gap between the substrate 300 and the syringe 301. That is, if the substrate 300 and the syringe 301 are too close together as compared to a desired gap, the seal pattern 316 formed on the substrate 300 widens and becomes low in height. Conversely, if the substrate 300 and the syringe 301 are too separated as compared to the desired gap, the seal pattern 316 formed on the substrate 300 narrows, and there may be a broken portion resulting in a defective liquid crystal display device.

In addition, if the sealant filled in the syringe 301 is completely used up, the seal pattern 316 may have a broken portion or the seal pattern 316 may not be formed. In this case, the syringe 301 should be replaced with another syringe 301 filled with the sealant before it is completely used up. At this time, however, the gap between the substrate 300 and the syringe 301 varies depending on how the syringe 301 is set into and combined with a holder (not shown). Thus, the gap between the substrate 300 and the syringe 301 should be reset each time the syringe 301 is replaced with a new one. Replacement of the syringe 301 frequently occurs in the actual manufacturing of products. Therefore, a technique for setting the gap between the substrate 300 and the syringe 301 within a short time is also required.

Figure 4:
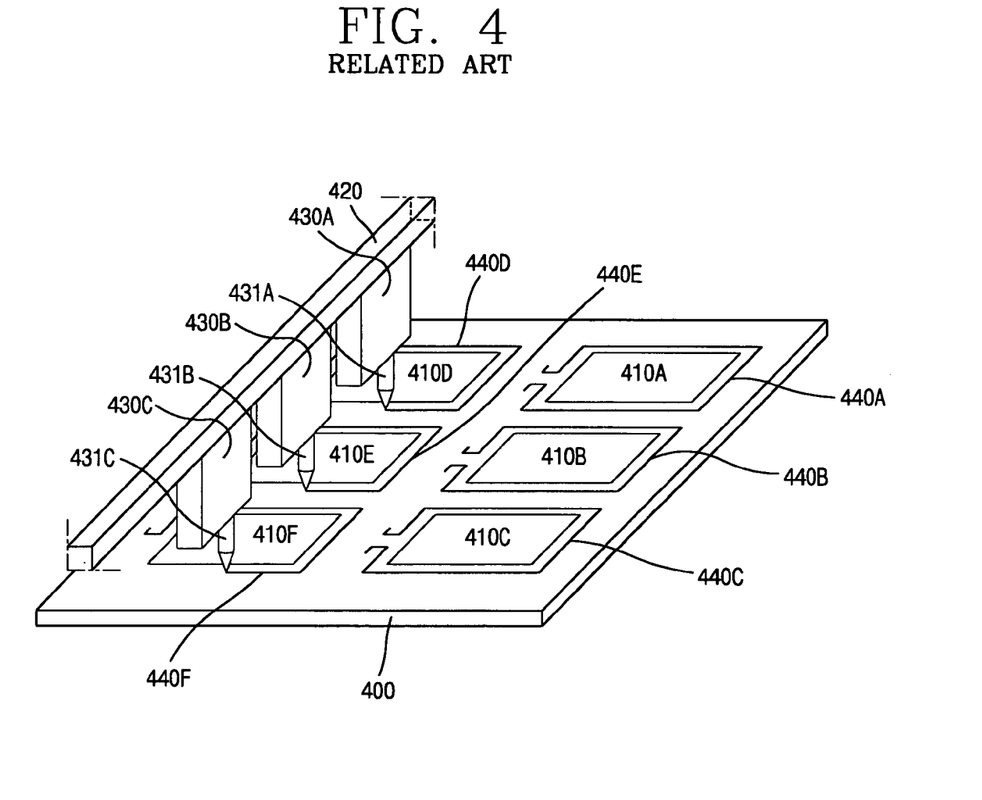
FIG. 4 is an exemplary view showing a dispenser for a liquid crystal display panel in accordance with the related art.

In addition, simultaneous formation of the plurality of image display portions 410 on the substrate 300 can improve a yield of the liquid crystal display panel. As shown in FIG. 4, in a related art dispenser for a liquid crystal display panel, a plurality of image display portions 410A-410F are formed on a substrate 400, and sealant is discharged from a plurality of dispensing units 430A-430C aligned and fixed at a support 420, to form a plurality of seal patterns 440A-440F along an outer edge of the image display portions 410A-420F formed on the substrate 400. The plurality of dispensing units 430A-430C respectively include syringes 431A-431C each having a nozzle at one end portion thereof to supply sealant to the substrate 400. Though not shown in FIG. 4, the plurality of dispensing units 430A-430C individually include a gap controller to control a gap between the substrate 400 and the syringes 431A-431C.

Thus, the related art dispenser and dispensing method of the liquid crystal display panel has a problem due to the restriction of space taken by the syringes 431A-431C and the gap controllers, which are individually provided for the plurality of dispensing units 430A-430C, it is impossible to form the seal patterns 440A-440F for a small liquid crystal display panel. In other words, if the liquid crystal display panel is too small, the seal patterns 440A-440F can not be formed due to interference between the dispensing units 430A-430C respectively having the syringes 431A-431C and the gap controllers.

SUMMARY OF THE INVENTION

Accordingly, the present invention is directed to a dispenser for fabricating a liquid crystal display panel that substantially obviates one or more of the problems due to limitations and disadvantages of the related art.

An object of the present invention is to provide a dispenser for fabricating a liquid crystal display panel capable of preventing mutual interference between adjacent dispensing units in performing a dispensing operation on a liquid crystal display panel, especially, but not limited to, a small liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a dispenser for fabricating a liquid crystal display panel comprises at least one dispensing unit to supply a dispensing material on a substrate; at least one support member to support and align the dispensing unit; and a plurality of syringes mounted on each dispensing unit.

In another aspect, a dispenser for fabricating a liquid crystal display panel comprises a plurality of dispensing units to contain a material to be dispensed; a plurality of support members to support and position the dispensing units; and a plurality of syringes to receive the material to be dispensed from the dispensing units and to supply the material to a substrate, at least two of the syringes mounted on each one of the dispensing units It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
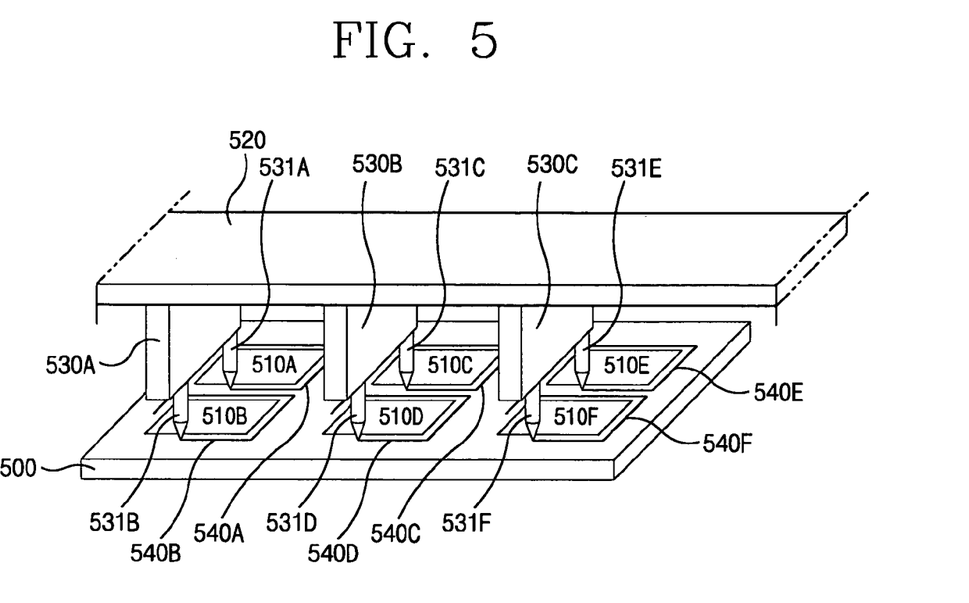
FIG. 5 is an exemplary view showing a dispenser for a liquid crystal display panel in accordance with an exemplary embodiment of the present invention.

FIG. 5 is an exemplary view showing a dispenser for a liquid crystal display panel in accordance with an exemplary embodiment of the present invention.

With reference to FIG. 5, a dispenser for a liquid crystal display panel includes a substrate 500 with a plurality of image display portions 510A-510F formed thereon, a plurality of dispensing units 530A-530C for supplying sealant to the substrate 500 to simultaneously form a plurality of seal patterns 540A-540F along each outer edge of the plurality of image display portions 510A-510F, and a support 520 for positioning and holding the plurality of dispensing units 530A-530C. The plurality of dispensing units 530A-530C respectively include two syringes (531A and 531B), (531C and 531D) and (531E and 531F) each having a nozzle at one end portion thereof to supply sealant to the substrate 500. Though not shown in FIG. 5, the plurality of dispensing units 530A-530C respectively include a gap controller for controlling a gap between the substrate 500 and the syringes (531A and 531B), (531C and 531D) and (531E and 531F). The sealant material or other dispensing material can be dispensed in a controllable manner according to a gas pressure applied via gas inlets (not shown) onto the material in the respective dispensing units 530A-530C.

The substrate 500 may be a first large-scale mother substrate made of glass on which a plurality of thin film transistor array substrates are formed, or a second large-scale mother substrate made of glass on which a plurality of color filter substrates are formed.

The syringes (531A and 531B), (531C and 531D) and (531E and 531F) provided in pairs, for example, on the plurality of dispensing units 530A-530C supply sealant through each nozzle formed at each one end portion thereof to form the plurality of seal patterns 540A-540F along each outer edge of the plurality of image display portions 510A-510F formed on the substrate 500. The syringes (531A and 531B), (531C and 531D) and (531E and 531F) correspond to the number of image display portions 510A-510F formed on the substrate 500, and two or more syringes may be provided on the plurality of dispensing units 530A-530C. For example, if nine image display portions are formed on the substrate 500, three syringes could be provided on each of the plurality of dispensing units 530A-530C. Similarly, while three dispensing units 530A-530C are provided in the exemplary illustrated embodiment, the number of dispensing units can be varied according to number of image display portions or other application parameters.

If desired, the plurality of syringes (531A and 531B), (531C and 531D) and (531E and 531F) respectively provided on the plurality of dispensing units 530A-530C may be fabricated to be movable at least in one direction of the plurality of dispensing units 530A-530C to suitably correspond to the size of the plurality of image display portions 510A-510F formed on the substrate 500. Or, at least one syringe may be fixed at the plurality of dispensing units 530A-530C and aligned together with the plurality of dispensing units 530A-530C at the support 520, and the other syringes may be formed to be movable at least in one direction of the plurality of dispensing units 530A-530C to suitably correspond to the size of the plurality of image display portions 510A-510F formed on the substrate 500.

As mentioned above, in the dispenser for fabricating the liquid crystal display panel in accordance with the present invention, since the plurality of syringes are provided at the plurality of dispensing units corresponding to the number of image display portions formed on the substrate, even if the number of image display portions formed on the substrate is increased, seal patterns may be concurrently formed along each outer edge of the image display portions, thereby improving productivity. In addition, since the plurality of syringes are provided at the plurality of dispensing units, seal patterns may be formed even in case of fabricating a small liquid crystal display panel.

In other words, referring back to the related art, if the liquid crystal display panel is too small, since syringes and gap controllers are individually provided at each of the plurality of dispensing units, seal patterns may not be formed due to the mutual interference between dispensing units. In comparison, however, in the present invention, the plurality of syringes are respectively formed at the plurality of dispensing units and fabricated to be movable corresponding to the size of the small liquid crystal display panel so that seal patterns may be formed along each outer edge of the plurality of image display portions suitably regardless of the size of the small liquid crystal display panel.

The seal patterns formed by the dispenser in accordance with the present invention may be varied in their forms according to methods for forming a liquid crystal layer on the liquid crystal display panel. The method for forming the liquid crystal layer on the liquid crystal display panel is roughly divided into a vacuum injection method and a dropping method.

The vacuum injection method uses a liquid crystal injection opening of a unit liquid crystal display panel separated from a large-scale mother substrate. The liquid crystal injection opening is put in a container filled with a liquid crystal in a chamber in which a certain vacuum is set. Then, liquid crystal is injected into the liquid crystal display panel according to a pressure difference between an inner side and an outer side of the liquid crystal display panel by varying a degree of the vacuum in the chamber. After the liquid crystal is filled in the liquid crystal display panel, the liquid crystal injection opening is sealed to form the liquid crystal layer of the liquid crystal display panel.

The liquid crystal injection opening is defined as a region opened at one side of each seal pattern. Accordingly, in the case of forming the liquid crystal layer on the liquid crystal display panel through the vacuum injection method, one portion of each seal pattern must be opened to function as the liquid crystal injection opening. The vacuum injection method as described above has the following problems.

First, it takes a long time to fill the liquid crystal into the liquid crystal display panel. In general, the attached liquid crystal display panel with an area of several hundreds cm² has a gap of a few micrometers (μm). Thus, even with the vacuum injection method, which uses pressure difference, the injection of liquid crystal takes a long time. For instance, in the case of fabricating a liquid crystal display panel of about 15 inches, it takes 8 hours to fill the liquid crystal display panel with liquid crystal. Thus, because such a long time is taken during the fabrication of the liquid crystal display panel, the productivity is degraded. In addition, as the liquid crystal display panel increases in size, the time required for filling liquid crystal correspondingly increases, thereby further decreasing the filling efficiency of liquid crystal. Therefore, the vacuum injection method can hardly cope with the large-scale liquid crystal display panel.

Second, with the vacuum injection method, too much liquid crystal is consumed. In general, the actually injected quantity of liquid crystal in the vacuum injection method is very small compared to the quantity of liquid crystal filled in the container. When liquid crystal is exposed in the air or to a specific gas, it reacts with the gas and degrades. Thus, even if liquid crystal in a container is filled into a plurality of liquid crystal display panels, a large quantity of liquid crystal remaining after the filling has to be discarded, thereby increasing the overall unit price of the liquid crystal display and decreasing price competitiveness.

In order to overcome such problems of the vacuum injection method, a dropping method is proposed.

In the dropping method, liquid crystal is dropped and dispensed on a plurality of thin film transistor array substrates fabricated on a first large-scale mother substrate or on color filter substrates fabricated on a second large-scale mother substrate. The first and second mother substrates are then attached to each other so that liquid crystal is uniformly distributed on entire image display regions by the attaching pressure, thereby forming a liquid crystal layer in each image display region. In other words, when forming the liquid crystal layer on the liquid crystal display panel through the dropping method, since liquid crystal is directly dropped on the substrate rather than being filled from an external source, seal patterns may be formed in a closed pattern encompassing the image display portions to prevent leakage of liquid crystal to outside of the image display portions.

Liquid crystal may be dropped using the dropping method in a shorter time as compared with the vacuum injection method, and the liquid crystal layer may be formed more quickly even though the liquid crystal display panel is large in size. In addition, since only enough liquid crystal is dropped as required, discharge of excess expensive liquid crystal is avoided, thereby avoiding the increase in the unit price of the liquid crystal display panel as compared with the vacuum injection method. As a result, price competitiveness is increased. Unlike the vacuum injection method, in the dropping method, after the liquid crystal layer is formed, the first large-scale mother substrate on which the plurality of thin film transistor array substrates are formed and the second large-scale mother substrate on which the plurality of color filter substrates are formed are attached. Then, unit liquid crystal display panels are separated from the attached large-scale mother substrates.

When using the dropping method, if the seal patterns are formed with thermosetting sealant, the sealant may flow out while being heated during the follow-up process of attaching the liquid crystal display panel, thereby contaminating the dropped liquid crystal. Thus, to avoid such a problem, the seal patterns are preferably formed with an ultraviolet (UV)-hardening sealant, or a mixture of UV-hardening sealant and thermosetting sealant.

The dispenser for fabricating a liquid crystal display panel in accordance with the present invention may be not only applied to formation of seal patterns on the substrate by filling it with sealant but may also be applied to dropping liquid crystal on the substrate through the dropping method as described above. Namely, the plurality of syringes provided respectively at each of the dispensing units corresponding to the plurality of image display portions formed on the substrate are filled with liquid crystal, and liquid crystal is dropped to the plurality of image display portions through each nozzle provided at one end portion of the syringes.

As mentioned above, in the case of dropping liquid crystal using the dispenser for the liquid crystal display panel of the present invention, liquid crystal may be quickly dropped on the image display portions because the plurality of syringes are respectively provided on the plurality of dispensing units corresponding to the number of image display portions formed on the substrate even if the number of image display portions increases. As a result, productivity may be enhanced. In addition, since the plurality of syringes are respectively provided at the plurality of dispensing units and movable corresponding to the size of the small liquid crystal display panel, liquid crystal may be dropped to the plurality of image display portions suitably corresponding to the size of the small liquid crystal display panel.

In another embodiment, an Ag (silver) dot may be formed on the substrate using the dispenser for a liquid crystal display panel in accordance with the present invention. The Ag dot will now be described with reference to FIG. 6.

Figure 6:
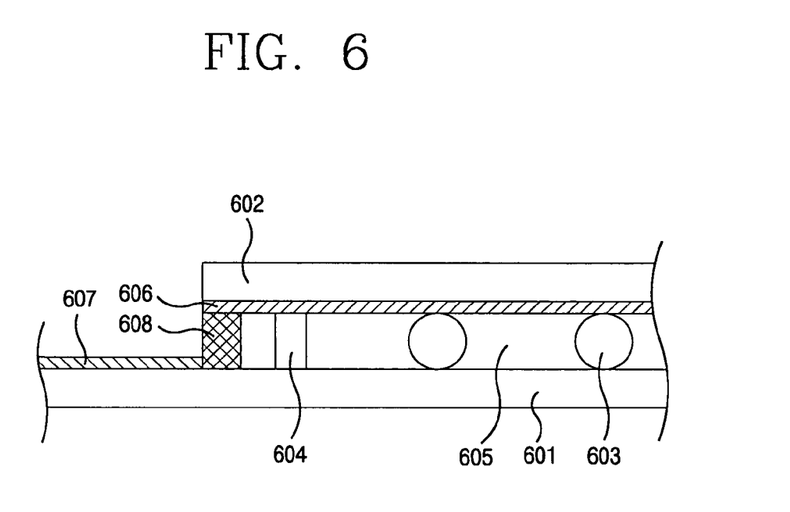
FIG. 6 illustrates a sectional structure of one edge of the liquid crystal display panel.

FIG. 6 illustrates a sectional structure of one edge of the liquid crystal display panel. As shown in FIG. 6, a liquid crystal display panel is formed such that a thin film transistor array substrate 601 and a color filter substrate 602 are attached in a facing manner with a certain gap by a spacer 603 and a seal pattern 604. A liquid crystal layer 605 is formed in the gap between the thin film transistor array substrate 601 and the color filter substrate 602. The thin film transistor array substrate 601 is formed having a protruded portion as compared to the color filter substrate 502. At the protruded portion, a gate pad portion connected to gate lines of the thin film transistor array substrate 601 and a data pad portion connected to data lines are formed.

In the image display portion of the thin film transistor array substrate 601, gate lines (to which a scan signal is applied from outside through the gate pad portions) and data lines (to which image information is applied through the data pad portions) are arranged to cross each other, and a plurality of thin film transistors for switching the liquid crystal cells is formed at each of the crossings of the gate lines and the data lines. In addition, a plurality of pixel electrodes connected to the thin film transistors are separately formed at cell regions. In the image display portions of the color filter substrate 602, color filters are formed in each of the cell regions that are separated by a black matrix. A common transparent electrode for driving the liquid crystal layer together with the pixel electrodes formed on the thin film transistor array substrate 601 is also formed on the color filter substrate 602. A common voltage line 607 for applying a common voltage to the common electrode 606 formed on the color filter substrate 602 is formed on the thin film transistor array substrate 601.

An Ag dot 608 is formed either on the thin film transistor array substrate 601 or the color filter substrate 602 to electrically connect the common voltage line 607 and the common electrode 606 so that the common voltage applied to the common voltage line 607 can be applied to the common electrode 606 using the Ag dot 608.

At least one or more Ag dots 608 are formed at each of the plurality of unit liquid crystal display panels fabricated on the large-scale mother substrate, which may be formed using the dispenser in accordance with embodiments of the present invention. Namely, after the plurality of syringes respectively provided at the plurality of dispensing units that correspond to the plurality of image display portions formed on the substrate are filled with silver, silver is discharged at each outer edge of the plurality of image display portions through each nozzle provided at one end portions of syringes, thereby forming the Ag dot 608.

As mentioned above, also in the case of forming the Ag dot 608 using the dispenser for the liquid crystal display panel in accordance with the present invention, the plurality of syringes are provided at the plurality of dispensing units corresponding to the number of the plurality of image display portions formed on the substrate. Thus, even if the number of image display portion formed on the substrate increases, the Ag dots 608 may be quickly formed on each outer edge of the image display portions, thereby improving productivity. In addition, since the plurality of syringes are provided at the plurality of dispensing units and fabricated to be movable corresponding to the size of the small liquid crystal display panel, the Ag dot 608 may be formed at each outer edge of the plurality of image display portions suitably corresponding to the size of the small liquid crystal display panel.

As described, the dispenser for a liquid crystal display panel in accordance with the embodiment of the present invention has numerous advantages. For example, because the plurality of syringes are provided at each of the plurality of the dispensing units corresponding to the number of image display portions formed on the substrate, even if the number of the image display portions formed on the substrate increases, seal patterns may be quickly formed. Similarly, even when dropping liquid crystal or forming the Ag dot, the process can be promptly performed, thereby enhancing productivity. In addition, because the plurality of syringes are provided at each of the plurality of dispensing units and fabricated to be movable corresponding to the size of a small liquid crystal display panel, seal patterns can be suitably formed corresponding to the size of the small liquid crystal display panel, and the dispenser of the present invention may be also used for the case of dropping liquid crystal or forming the Ag dot on the small liquid crystal display panel.

It will be apparent to those skilled in the art that various modifications and variations can be made in the dispenser for fabricating a liquid crystal display panel of the present invention without departing from the spirit or scope of the inventions. Thus, it is intended that the present invention cover the modifications and variations of this invention provided that they come within the scope of the appended claims and their equivalents.

The present application also incorporates by reference U.S. Patent Publication No. 2003-0223030-A1 and Korean Patent Application No. 35416/2003 filed in Korea on Jun. 2, 2003.

What is claimed is:

1. A dispenser for dispensing a dispensing material onto a substrate having a plurality of image display portions arrange in a matrix array, comprising:

a plurality of dispensing units to contain a material to be dispensed, wherein each one of the plurality of dispensing units corresponds to a row of the matrix array of the plurality of image display portions;

a support member to support and position the dispensing units; and a plurality of syringes to receive the material to be dispensed from the dispensing units and to supply the material to a substrate, at least two of the syringes mounted on each one of the dispensing units and the each syringe dispensing the dispensing material along the peripheral region of the corresponding image display portion, wherein the distance between the syringes in the dispensing unit is determined by the size of the image display portion.

2. The dispenser according to claim 1, wherein a plurality of thin film transistor arrays is defined on the substrate, each thin film transistor array corresponding to a respective one of the plurality of image display portions defined on the substrate.

3. The dispenser according to claim 2, wherein the plurality of image display portions are disposed as an array of image display portions on the substrate, and wherein the number of the syringes provided on each one of the dispensing units corresponds to the number of image display portions formed in a row of the array of image display portions.

4. The dispenser according to claim 1, wherein a plurality of color filter arrays is formed on the substrate, each color filter array corresponding to a respective one of the plurality of image display portions defined on the substrate.

5. The dispenser according to claim 4, wherein the plurality of image display portions are disposed as an array of image display portions on the substrate, and wherein the number of the syringes provided on each one of the dispensing units corresponds to the number of image display portions formed in a row of the array of image display portions.

6. The dispenser according to claim 1, wherein the material includes a sealant for forming a seal pattern.

7. The dispenser according to claim 6, wherein the seal pattern defines an opening at one portion.

8. The dispenser according to claim 6, wherein the seal pattern defines a closed pattern encompassing the image display portion.

9. The dispenser according to claim 1, wherein the material includes liquid crystal material.

10. The dispenser according to claim 1, wherein the material includes silver (Ag).

11. The dispenser according to claim 1, wherein at least one of the plurality of dispensing units includes a gap controller to control a gap between the substrate and the syringes.

12. The dispenser according to claim 1, wherein each one of the plurality of syringes provided on each one of the dispensing units are movable in at least one direction of the plurality of dispensing units.

13. The dispenser according to claim 1, wherein at least one of the plurality of syringes provided on each one of the plurality of dispensing units is fixed with respect to the dispensing unit and the other ones of the syringes are movable at least in one direction of the dispensing unit.

14. The dispenser according to claim 1, further comprising gas inlets for controlling dispensing of the dispensing material in the plurality of dispensing units.

* * * * *